E. J. VAUDREUIL.
PROCESS OF PREPARING GREEN BEANS FOR CANNING.
APPLICATION FILED JULY 29, 1918.
1,344,069.
Patented June 22, 1920.
2 SHEETS—SHEET 1.
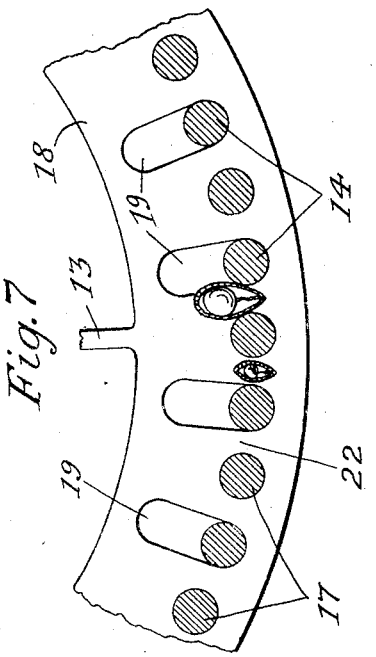
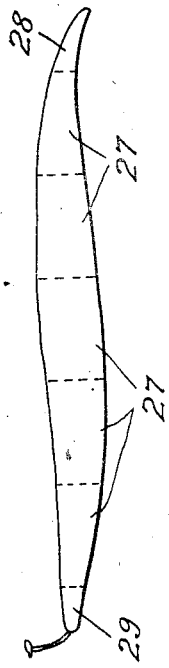
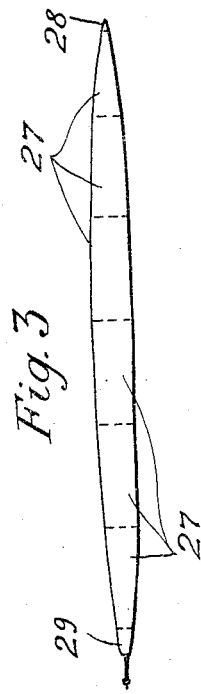
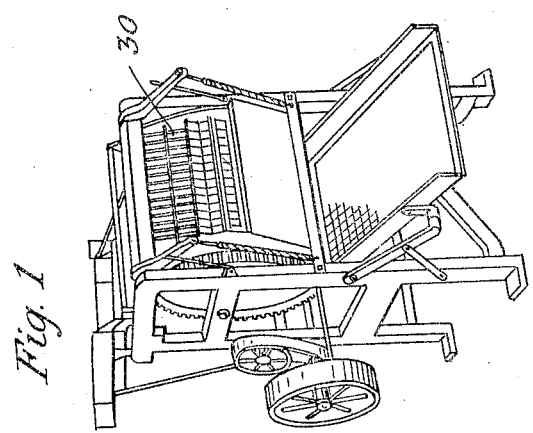
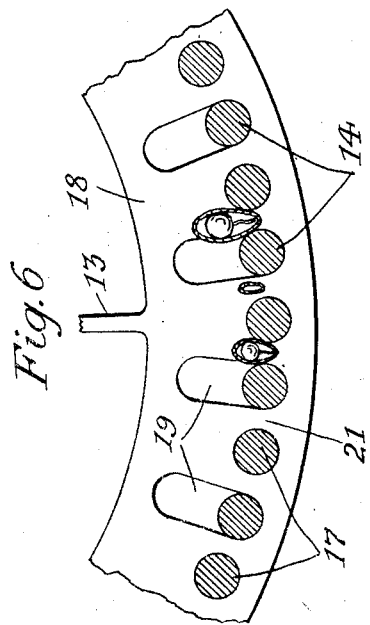
Inventor:
Edward J. Vaudreuil
By Whiteley and Ruckman
his Attorneys.

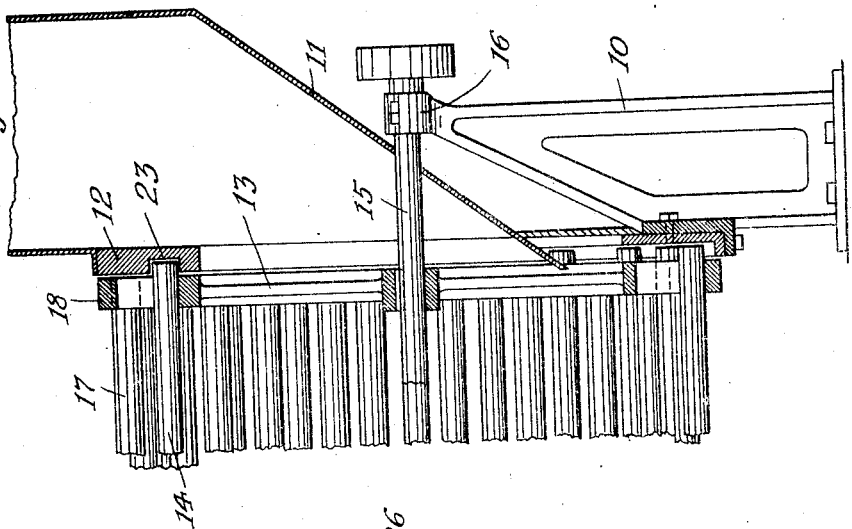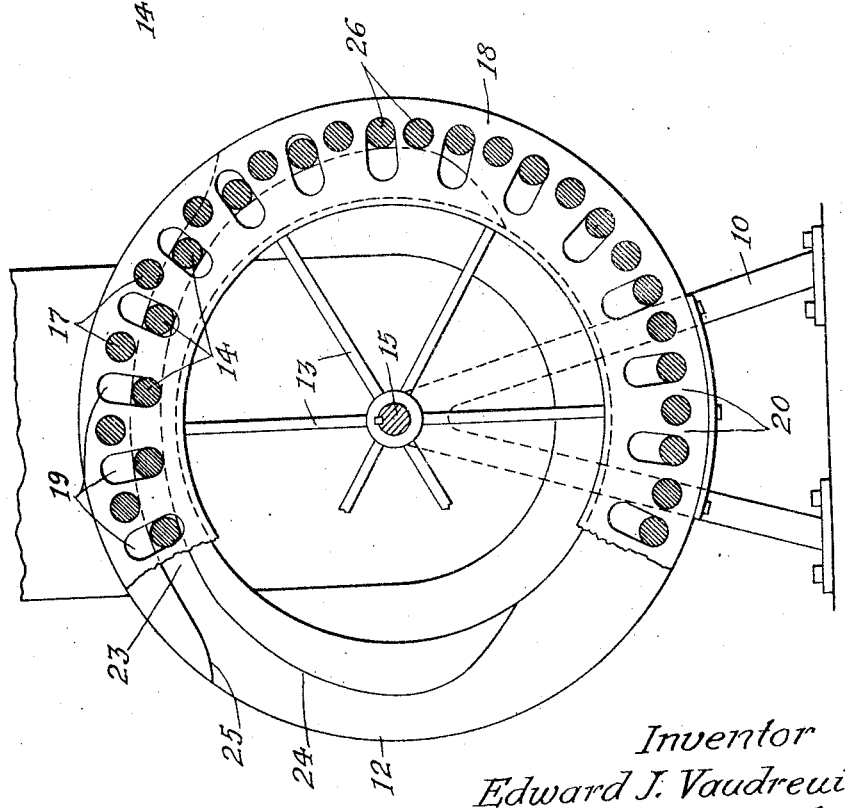

UNITED STATES PATENT OFFICE.

EDWARD J. VAUDREUIL, OF EAU CLAIRE, WISCONSIN.

PROCESS OF PREPARING GREEN BEANS FOR CANNING.

1,344,069.  Specification of Letters Patent.  Patented June 22, 1920.

Application filed July 29, 1918. Serial No. 247,114.

*To all whom it may concern:*

Be it known that I, EDWARD J. VAUDREUIL, a citizen of the United States, residing at Eau Claire, in the county of Eau Claire and State of Wisconsin have invented certain new and useful Improvements in Processes or Preparing Green Beans for Canning, of which the following is a specification.

My invention relates to a process of preparing green beans for canning. The type of beans to which my process applies are beans wherein the pod, including the kernel, is cooked and eaten. Such bean pods are suitable for canning. Certain varieties such as flat wax beans grow substantially of one size and may suitably be cut up into pieces before canning. Other varieties, such as the refugee green pod beans, ordinarily as harvested include a number of sizes. In practice such beans have generally been graded into five sizes or allotments. Sizes number one and number two are generally canned whole. And the three larger sizes, number three, number four and number five, may economically be cut into pieces and canned in fragments. In either case, however, it is necessary to remove both tip ends of the bean pod. In practice this has been done by hand, the tip ends being broken off or snipped, generally by women or girls employed for that purpose. The snipping of the beans has required the employment of a large amount of labor which is not only expensive but is difficult to obtain, and various appliances have been devised for snipping the ends of the beans by machinery.

It is the object of my invention to provide a cheap and efficient method of preparing bean pods for canning by cutting them up and removing the objectionable tip ends without the employment of a specific snipping step. To this end my process consists in first assorting or grading the bean pods (where that is necessary) so as to eliminate from any lot the smaller sizes such as number one and number two refugee beans which may be desirable to have canned whole; then cutting the pods into suitable pieces and thereafter removing the tip ends from the mass of the cut beans.

This last step may be performed, I have discovered, by running the mass of cut beans through a suitable bean-grading mechanism whereby the tip end portions will be eliminated from the mass of beans which it is desired to retain and can. This is made possible because of the fact that the bean pod as it grows tapers sharply at both ends, so that if the pod is run through a cutter which is designed to cut the entire pod into portions of predetermined length, such as three-fourths of an inch or one inch, I have found that both tips will be invariably attached to pieces so much smaller than the other pieces that such tip ends may readily be eliminated from the mass in automatic grading or assorting mechanism. In this manner the expensive independent step of snipping, whether performed by hand or by automatic machinery, will be entirely eliminated for any cut beans. My process will apply effectively to all sizes of beans larger than the number one and number two. For flat wax beans it will not be necessary to have any preliminary grading, as in such cases the pods are sufficiently near of a size and generally sufficiently large to enable my process to be applied effectively upon the entire mass of pods harvested at any time. Where a considerable part of any batch of beans harvested will be the small number one and number two sizes it will generally be advisable to grade out these sizes from the entire picking first, then applying the cutting and separating steps of my process.

The full objects and advantages of my invention will appear in connection with the detailed description thereof and are particularly pointed out in the claims.

In the drawings appended hereto, as illustrating forms of machines which may be efficiently applied to the carrying out of my process,—

Figure 1 is a view of a cutting machine of common type designed to cut the bean pods into pieces of the desired length, usually from three-fourths of an inch to one inch long. Fig. 2 is a view of a bean pod before the same has been cut, showing the tapered tip ends of the pod. Fig. 3 is an edge view of a bean pod showing the manner in which the pod will be cut up, producing small pieces for the two tip ends. Fig. 4 is a side sectional elevation and Fig. 5 a transverse sectional elevation of a grading machine suitable for separating the cut pieces from the small end pieces. Figs. 6 and 7 are sectional views of the grading machines shown in Figs. 4 and 5, having openings of different sizes for separating bean pods or cut bean pods of correspondingly differing sizes.

In the practice of my invention I first run the bean pods through a grading machine such as shown in Figs. 4 and 5 whereby the number one and two pods are separated from the lot, unless the pods are of the flat wax variety, which would not require any preliminary separation. The grading machine of Figs. 4 and 5 is similar to that disclosed in my co-pending application No. 223,177, filed March 18, 1918. In this form of device a frame 10 carries an inlet hopper 11 adapted to discharge through a stationary ring 12 and a rotating spider 13 into a cylinder formed by a multiplicity of rods 14. The rods 14 are carried by rings 18 on the spiders 13 held in parallel relation with the stationary rings 12. Every alternate rod 14, as indicated at 17, is held fixedly in the rings 18, the intervening rods 14 extending through slots 19 in the rings 18, as is most clearly shown in Figs. 5, 6 and 7. At the lower part of rotation the rods 14 are spaced apart as indicated at 20 in Fig. 5, or a different distance as indicated at 21 in Fig. 6, and as indicated at 22 in Fig. 7. These spaces are sufficient to permit the small bean pods of number one or number two beans, or the small end pieces of the tips of cut beans to pass through and out of the mass, but are too small to permit the larger sizes of bean pods or of cut beans to pass through. The rods mounted in the slots 19 are permitted and constrained to move inwardly as indicated in Fig. 5 by means of cam slots 23 formed in the upper portions of the stationary rings 12 by means of a lower projection 24 and an upper projection 25. The rods will, in fact, remain in their outer position by gravity until they reach the position indicated at 26 on Fig. 5, after which they will tend to gravitate to the inner ends of the slots 19, riding upon the projections 24 until they pass the extreme upper arc of rotation, after which they will again return to the outer positions wherein, at the lower portion of said arc together with the stationary rods, they define the openings 20, 21 or 22. By this means the rods are separated at the top of the arc of rotation, thus releasing any bean pods or pieces which may have become wedged between pairs of rods but which are too large to pass through the openings 20, 21 or 22.

As above stated, the grading member is used preliminarily to take out number one and number two bean pods where that is necessary. After this preliminary separation the remaining pods, numbers three, four and five, or the entire lot of pods if no separation is necessary, are run through a cutting machine 30 of ordinary type, as indicated in Fig. 1. By this means each pod is cut into a number of intermediate pieces 27 and two tip pieces 28 and 29. As shown by the figure, the relative size of the tip pieces may vary, but it will be generally true that in every case the tip pieces 28 and 29 will be much smaller on both of their largest major diameters than is true of any of the other pieces. It follows, therefore, that these tip pieces will readily pass through the larger sized openings 22 of a grader such as that shown in Figs. 5 and 7, while all of the pieces 27 will be retained by such grader. As fast as the beans are cut up by the cutting machine 30 the entire mass, including the intermediate pieces 27 and the tip pieces 28 and 29, will be run through the grader. The tip pieces will thereby be eliminated by the grader and the intermediate pieces conveyed from the grading machine where they may be subjected to the final canning operations. In this manner the expensive and time-consuming operation of separate snipping of the beans, whether done by hand or machinery, is entirely eliminated.

I claim:

1. The process of preparing green beans for canning which consists in simultaneously cutting the complete unsnipped bean pods into pieces and producing an intermingled mass of intermediate pieces and tip-end pieces, and thereafter automatically separating from the mass of cut pieces all of said tip-end pieces.

2. The process of preparing green beans for canning which consists in simultaneously cutting the complete unsnipped bean pods into tip-end pieces and intermediate pieces of equal length and producing an intermingled mass of said intermediate pieces and tip-end pieces, and thereafter automatically separating from the mass of cut pieces all of said tip-end pieces.

3. The process of preparing green beans for canning which consists in removing from the beans as picked all bean pods of a size too small to be suitable for canning as cut beans, then simultaneously cutting the remaining complete unsnipped bean pods into pieces and producing an intermingled mass of intermediate pieces and tip-end pieces, and thereafter automatically separating from the mass of cut pieces all of said tip-end pieces.

4. The process of preparing green beans for canning, which consists in simultaneously cutting the complete unsnipped bean pods into pieces and producing an intermingled mass of tip-end pieces and intermediate pieces, automatically separating from the mass of cut pieces all of said tip-end pieces, and performing said steps continuously in succession upon any quantity of unsnipped bean pods to produce therefrom the desirable portions cut and ready for canning with the undesirable tip-end portions eliminated.

In testimony whereof I hereunto affix my signature.

EDWARD J. VAUDREUIL.